Feb. 5, 1935.  S. H. W. DAWSON  1,990,427
MEANS FOR STARTING COMPRESSION IGNITION OIL ENGINES
Filed Jan. 23, 1931  4 Sheets-Sheet 1

INVENTOR
BY
ATTORNEYS

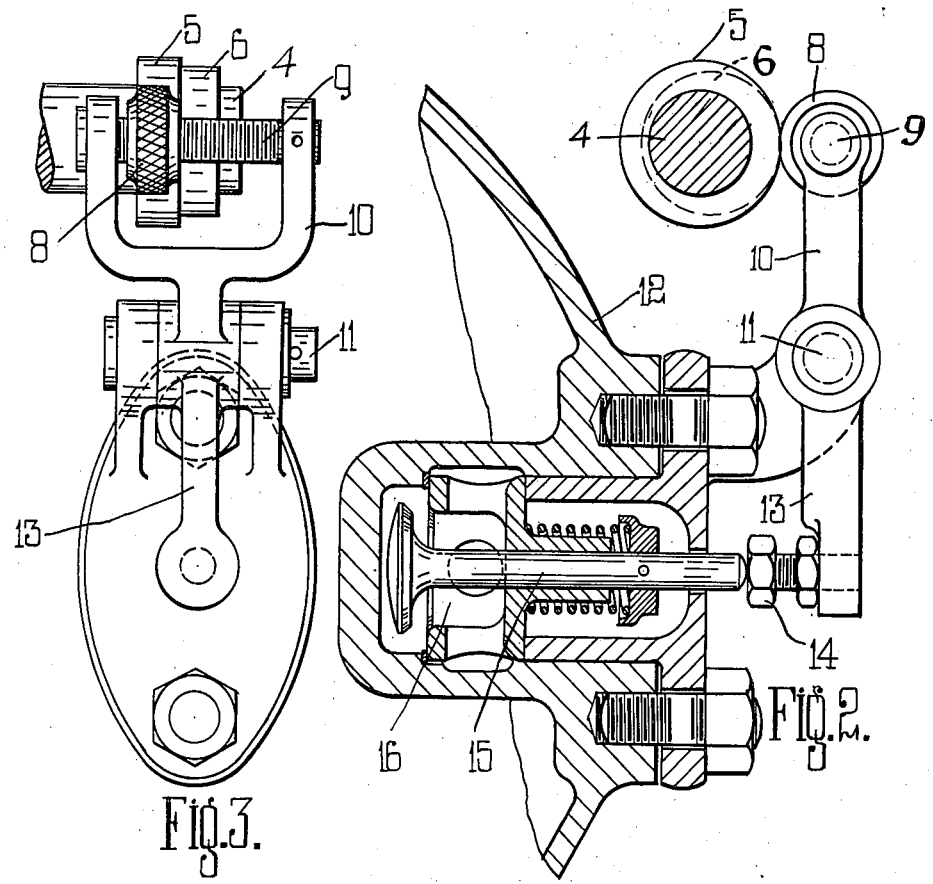
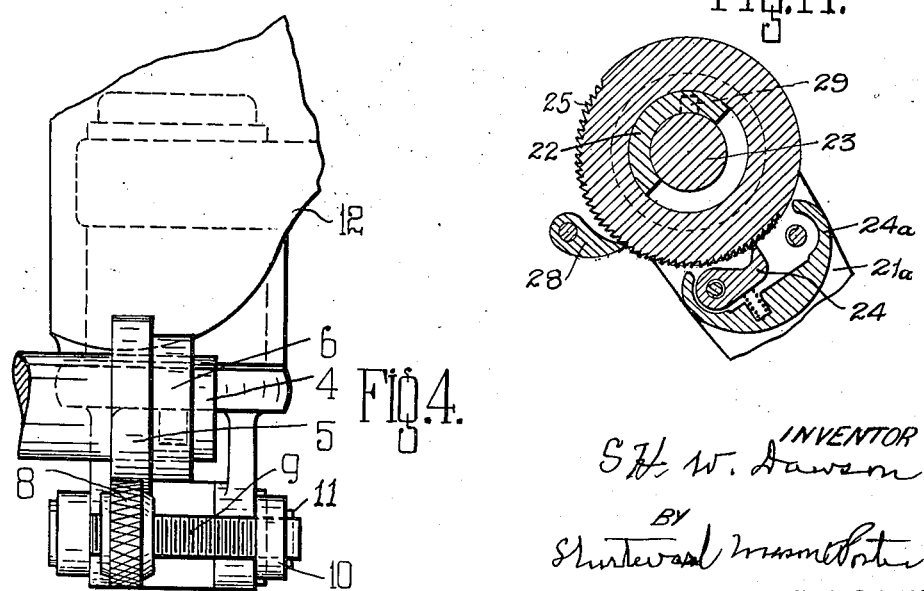

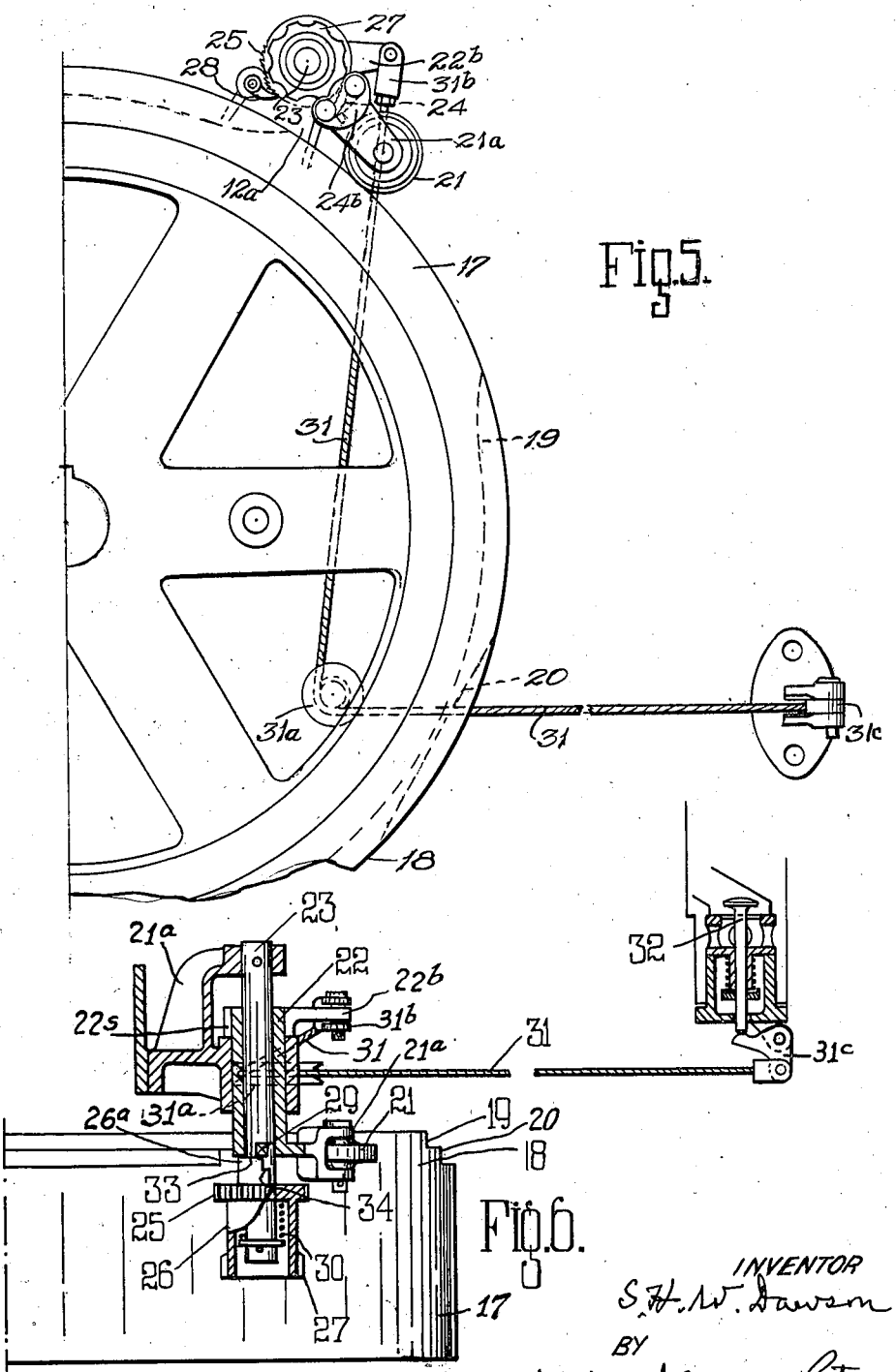

Patented Feb. 5, 1935

1,990,427

UNITED STATES PATENT OFFICE 1,990,427

MEANS FOR STARTING COMPRESSION-IGNITION OIL ENGINES

Samuel Horace Wright Dawson, Gainsborough, England, assignor to Marshall, Sons and Company Limited, Gainsborough, England, a British company Application January 23, 1931, Serial No. 510,808
In Great Britain June 5, 1930

5 Claims. (Cl. 123—182)

The present invention relates to oil engines of the type which normally run with a compression pressure sufficiently high to cause ignition of the fuel. This type includes "Diesel" engines but excludes engines such as "Semi-Diesel" in which hot bulb or surface ignition is employed.

Normally Diesel engines are started at full compression, namely ignition of the fuel takes place at a pressure of substantially 450–550 lbs. per square inch. In view however, of the increasing range of application of Diesel engines, in certain cases this high compression pressure has been found to be impracticable for ignition at starting.

According to the present invention ignition of the fuel at starting is effected with the aid of an ignition cartridge and at reduced pressure, preferably half compression pressure.

Preferably the flywheel is manually rotated for a predetermined number of revolutions under no compression, thence for a predetermined number of revolutions under a maximum of half compression whereupon ignition takes place and subsequently the flywheel rotates as in the ordinary manner with full compression during each two or four strokes of the piston according as to whether the engine is operating on a two-stroke cycle or four-stroke cycle.

The invention is more particularly described with reference to the accompanying drawings in which:—

Figure 2 is a sectional elevation of part of the auxiliary gear for facilitating the starting of the engine.

Figure 3 is a corresponding outside end view.

Figure 4 is a corresponding top plan view.

Figure 5 is a side elevation of a modified form of construction.

Figure 6 is a corresponding plan view.

Figure 14 is a sectional view, on a larger scale, at a right angle to the spindle 23, showing the relationship of the ratchet and pawls.

Figure 1:
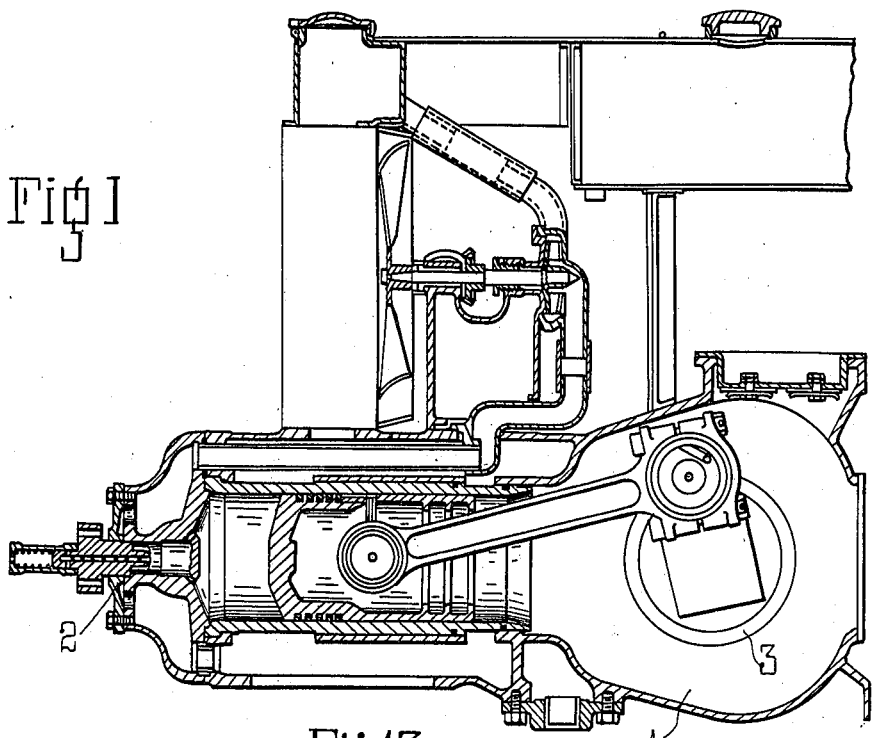
Figure 1 is a diagrammatic sectional elevation of a suitable form of engine to which the invention relates.
Figure 12:
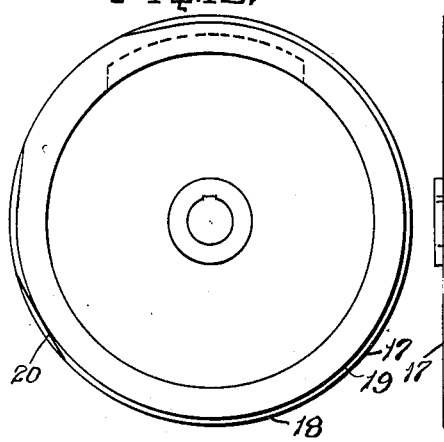
Figure 12 is a diagrammatic end view of a fly wheel employable with a modified form of Figures 5 and 6.
Figure 13:
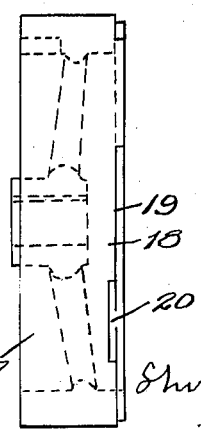
Figure 13 is a view thereof at a right angle to that of Figure 12.

The engine 1, Figure 1, which may be a single cylinder or multi-cylinder engine operates with fuel projected under pressure through the nozzle 2 in known manner, and is of the Diesel or heavy oil engine type, but excludes engines of the Semi-Diesel type in which a hot bulb or surface ignition is employed.

To facilitate the starting of the engine by this invention driven from the main shaft 3 of the engine is a cam shaft 4, which may be the usual cam shaft operating the valves which has stepped cams 5, 6, upon it engaging with a roller 8 mounted in the form of a nut upon a threaded spindle 9 mounted in a yoke 10 pivoted about a spindle 11 on the engine crank case or frame 12. This yoke 10 has an arm 13 operating through an adjustable tappet 14 a compression release valve 15.

When therefore, it is desired to operate the engine, the friction roller 8 will be brought manually to the position shown in Figure 3. This may be accomplished by lifting the yoke 10 away from the step cams 5 and 6, and spinning the friction roller 8 back to the initial position. The engine flywheel is then rotated by hand and the threading of the spindle 9 is such that four revolutions of the flywheel by hand will suffice to bring the roller 8 from the cam surface 5 on to the cam surface 6. It will be seen that during the whole of the time that the roller 8 has been on the cam surface 5, the valve 15 will have remained open so that the flywheel can be rotated with complete ease by hand. During the next four revolutions of the engine flywheel by hand, the roller 8 will be lying on the half compression cam 6, so that whilst the cylinder is open to atmosphere through the port 16, controlled by the valve 15 during the first operation of each compression stroke, it will be closed during the remaining portion of such stroke to allow ignition to be effected on half compression by means for instance, of a starting ignition cartridge. As the cam shaft 4 rotates, the friction wheel 8 will be fed further along the spindle 9 until it drops off the cam 6 and the engine can then run under full compression in normal manner.

Figure 7:
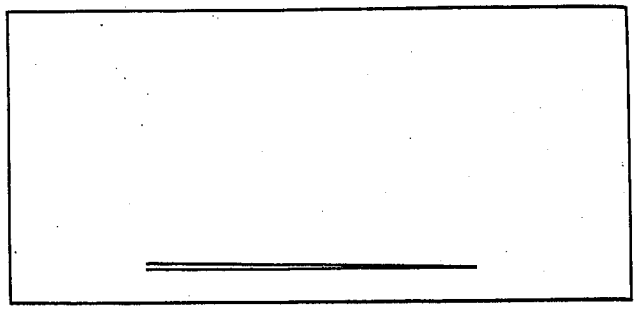
Figures 7 to 11 are indicator diagrams illustrating the method of starting.

Referring to Figures 7 to 11, it will be seen that Figure 7 will be a representative indicator diagram of the first four strokes of the engine, whilst the roller 8 is on the cam 5.

Figure 8:
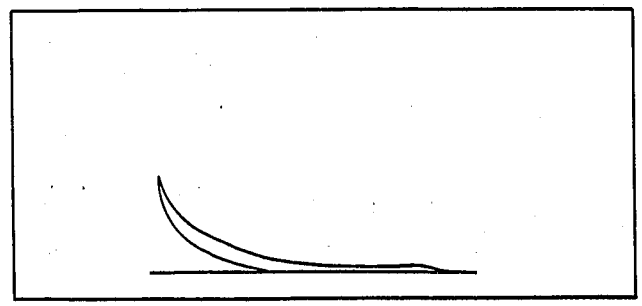
Figure 9:
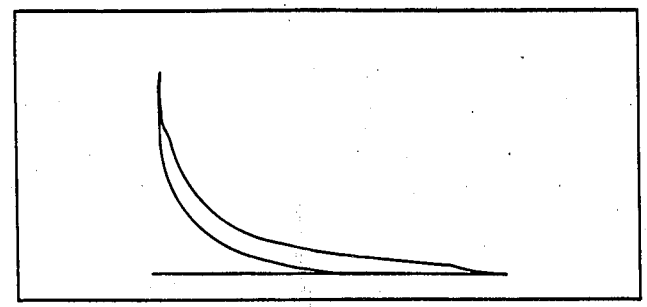
Figure 10:
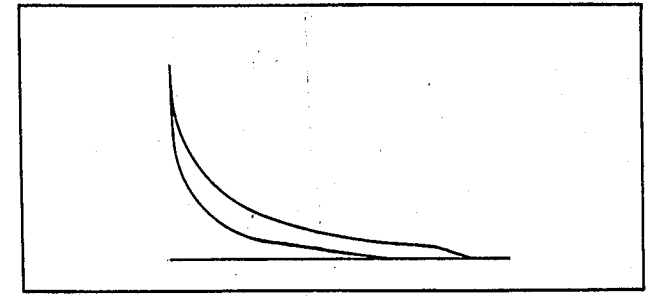
Figure 11:
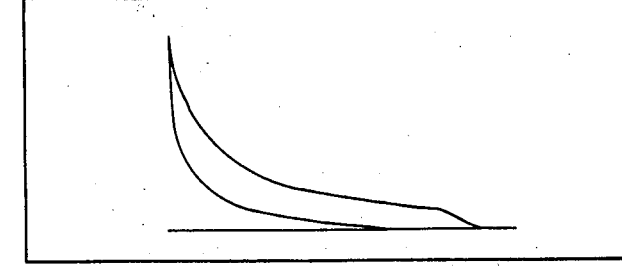

Figure 8, however, will be the diagram corresponding to the time when the roller 8 will be on the cam 6, whilst directly the engine starts working under full compression and the roller 8 is free from contact with a cam surface, the diagram will be as Figure 9. Figures 10 and 11 are diagrams of the engine operating under half load and full load respectively.

Instead of operating the device from the cam shaft, the device may operate for instance from the fly wheel 17 of the engine, as illustrated in Figures 5, 6, 12, 13 and 14.

The fly wheel 17 in this case is provided with the cam surfaces 18 and 19 at the edge of its periphery. The cam surface 18 is substantially circular for most of its periphery whereby to hold the valve 32 open during the normal compression stroke, but is provided with a depressed portion 20 for effecting a movement of the operating mechanism for the valve control, as described hereinafter.

On the frame bracket 12a, is mounted a fixed spindle 23 (Figure 6) which is held against rotation. A rockable sleeve 22 surrounds the spindle and may rock and move axially with respect thereto. An arm 21a rigid with the sleeve 22 supports the cam roller 21 which may move on the cam surfaces 18 or 19 or be entirely disengaged from the fly wheel by passing from the periphery thereof (in an axial direction, Figure 6). A second arm 22b rigid with the sleeve 22 is connected to the cable attachment member 31b which in turn is connected to a cable 31 which passes over a pulley 31a journalled on the frame, and is then connected to a crank lever 31c (Figure 6) which serves to open the compression release valve 32 when the cable 31 is pulled.

The sleeve 22 is preferably journaled externally in a portion of the bracket 12a (Figure 6) and has stop portions 22s thereon to limit the axial movement of the sleeve 22.

At the free end of the spindle 23 is provided a bushing 26 which surrounds the end of the spindle 23 and has a spring 30 engaged between a shoulder at the end of the spindle and an inwardly projecting flange of the bushing 26. On the bushing 26 are formed external teeth 27 constituting a hand wheel for assistance in pulling and rotating the bushing 26. Likewise formed in the bushing 26 are the ratchet teeth 25 located adjacent the arm 21a of the sleeve 22. A collar 26a of the bushing 26 provides a mechanical connection between the bushing 26 and sleeve 22 so that axial movements of the bushing 26 by its spring 30 are transmitted to the sleeve 22. The collar 26a is cut away (Figure 6) to provide the steps 33 and 34 for engagement with a fixed stop 29 on the spindle 23.

A rigid structure 24a on the arm 21a extends past the ratchet teeth 25 (Figure 14) and encloses and supports a spring-held pawl 24 in engagement with these teeth 25, so that during the rocking of arm 21a in an outward or counterclockwise direction, the bushing 26 is rotated intermittently. A retaining pawl 28 on the frame bracket 12a prevents retrograde movement of the bushing 26. A cover plate 24b for the housing 24a engages (Figure 5) over the flanged portion of bushing 26, having the ratchet teeth 25, and holds the bushing 22 and sleeve 26 together when the bushing is pulled axially in Figure 6.

In operation, prior to starting, the hand wheel 27 is seized and pulled (axially in Figure 6) until the collar 26a is free of the fixed stop 29. The bushing 26 is then rotated until the edge of the collar is brought opposite the stop 29, and until the pawl 24 engages with the ratchet teeth 25 at such a position that a predetermined number of oscillations of the arm 21a will be required before the bushing 26 has rotated so that the edge of the collar 26a escapes from the stop 29. During this operation, the roller 21 or its arm 21a is swung outward so that it may be moved to a position above the fly wheel 17, and is then lowered onto the periphery of the fly wheel and then lies (Figure 6) on the cam 18.

The fly wheel 17 is now rotated, and since the cam 18 is holding the roller 21 outward for the entire compression stroke, the fly wheel may be easily brought up to a starting speed. During each rotation of the fly wheel, however, the depressed portion 20 causes an inward and outward movement of the roller 21 and therewith a rocking of the sleeve 22, and through the pawl 24 a stepwise movement of the bushing 26. After a predetermined number of revolutions, for example four, the intermittent movement of the bushing 26 brings the end of collar 26a beyond the fixed stop 29 and spring 30 now operates to force the bushing 26 and sleeve 22 upward in Figure 6 until limited by the engagement of step 33 with the stop 29. The roller 21 now is operated by cam 19, so that it is held outward for the first half of the compression stroke only and then moves inward so that sleeve 22 may rock clockwise in Figure 5, and therewith its arm 22b releases the cable 31 and the latter in turn permits the closing of the relief valve 32 for the latter portion of the compression stroke. In this way, the engine continues operating under half compression.

The inward and outward movements of the roller 21, however, continue through the pawl 24 to cause an intermittent movement of the bushing 26 until the step 33 is no longer beneath the stop 29, and then a further axial movement of the bushing 26 occurs which is finally limited by the engagement of step 34 with the stop 29. Therewith, the sleeve 22 moves until its arm 21a carries the roller 21 past the edge of the fly wheel, so that no further rocking of sleeve 22 occurs. Thereafter, the valve 32 remains closed and the engine operates in normal manner.

Thus it will be seen that by fixing the angular movement of the arm 21a with respect to the ratchet teeth 25, a predetermined number of movements of the arm will occasion a movement of the bushing 26 and its collar 26a according to the angular dimensions of the steps 33 and 34 and of the initial position of the stop 29 with respect to the edge of collar 26a, so that predetermined numbers of revolutions of the fly wheel occur with compression relieved (whereby the spinning of the engine is eased) and with half compression (whereby firing may occur to bring the engine up to operating speed).

The devices of Figures 2 to 4 and Figures 5 and 6 respectively are in each case inoperative during the normal running of the engine and will be re-set by hand prior to starting.

It will be appreciated that in the case of a four-stroke cycle engine it is desirable to form the cam faces, for operating the selector mechanism, on a half-speed shaft instead of on the fly wheel.

Where more than one cylinder is employed a single selector mechanism may operate a valve on each cylinder or more than one selector mechanism may be utilized. Again if desired, one cylinder only may be operated as described and the other cylinder or cylinders may remain on no compression until this is effected.

The device is particularly suitable for use with Diesel engines mounted on tractors and when it is so employed it is possible for one man only to start easily and by hand a high compression engine on half or reduced compression, a comparatively light flywheel only being required.

No invention is claimed merely in the use of a starting cartridge as such as disclosed in British Patent No. 203,524, to Petter, dated September 12, 1922.

I declare that what I claim is:—

1. A heavy oil engine comprising in combination a cylinder, a piston, a crank shaft driven thereby, a fly wheel, an auxiliary compression relief valve open for a number of revolutions of said crank shaft, means on said fly wheel to open said compression relief valve during a portion of the compression stroke only for a subsequent number of revolutions of said engine and fly wheel, and means to maintain said compression relief valve closed during all subsequent revolutions of said crank shaft.

2. A heavy oil engine comprising in combination a cylinder, a piston, a crank shaft driven thereby, a compression relief valve, a tappet operating said compression relief valve, a first cam operating said tappet adapted to maintain the compression relief valve constantly open, a second cam driven from said crank shaft adapted to maintain said compression relief valve open only for a portion of the compression stroke, and means to displace said tappet from said first cam to said second cam and from said second cam to an inoperative position.

3. A heavy oil engine comprising in combination a cylinder, a piston, a crank shaft driven thereby, a compression relief valve, a tappet operating said compression relief valve, an internally threaded friction roller on said tappet, a threaded spindle supporting said roller, a first cam rotating about an axis parallel to said threaded spindle and in engagement with said threaded roller adapted to maintain the compression relief valve permanently open, a second cam rotating about the same axis and immediately adjacent thereto adapted to engage said roller when automatically displaced along the said threaded spindle to maintain the compression relief valve open for a certain portion only of the compression stroke.

4. A heavy oil engine comprising in combination a cylinder, a piston, a crank shaft driven thereby, a compression relief valve, a tappet for operating said valve, a ratchet toothed sleeve connected to said tappet, a fixed pivotal axis for said sleeve, a ratchet pawl adapted to step by step rotate said sleeve, a cam operating said ratchet pawl, a spring tending to thrust said sleeve, axial stops limiting the displacement of the sleeve and a second cam adapted to operate said ratchet pawl after the sleeve has been displaced from one stop to the next stop.

5. A heavy oil engine comprising in combination a cylinder, a piston, a crank shaft driven thereby, a fly wheel, an auxiliary compression relief valve which is to be held open for a number of revolutions of said crank shaft, a tappet operable to displace said relief valve, a first cam face on said fly wheel operating said tappet to maintain said compression relief valve constantly open, a second cam face on said fly wheel operating said tappet to maintain said compression relief valve open during a portion of the compression stroke only, means to displace said tappet from said first cam face on said fly wheel to said second cam face, and means to displace said tappet from said second cam face to maintain said compression relief valve closed during all subsequent revolutions of said crank shaft.

SAMUEL HORACE WRIGHT DAWSON.